United States Patent [19]

Pfeifer

[11] Patent Number: 4,633,517

[45] Date of Patent: Dec. 30, 1986

[54] CIRCUIT FOR DECODING TRAFFIC INFORMATION MESSAGE TONE SIGNALS

[75] Inventor: Heinrich Pfeifer, Denzlingen, Fed. Rep. of Germany

[73] Assignee: Deutsche ITT Industries GmbH, Freiburg, Fed. Rep. of Germany

[21] Appl. No.: 736,633

[22] Filed: May 21, 1985

[30] Foreign Application Priority Data

Jun. 1, 1984 [EP] European Pat. Off. ........ 84106270.6

[51] Int. Cl.[4] ........ H04B 1/16

[52] U.S. Cl. ........ 455/228; 455/45; 340/905; 340/825.48

[58] Field of Search ........ 455/35, 36, 45, 226–228; 340/905, 825.44, 825.48

[56] References Cited

U.S. PATENT DOCUMENTS 4,450,589 5/1984 Eilers ........ 455/228

4,561,115 12/1985 Pfeifer ........ 455/228

FOREIGN PATENT DOCUMENTS 65025 4/1982 Japan ........ 455/228

*Primary Examiner*—Jin F. Ng

*Attorney, Agent, or Firm*—Donald J. Lenkszus

[57] ABSTRACT

An essentially digital circuit is disclosed in which a demodulated broadcast signal is digitized by an analog-to-digital converter and processed in three signal paths each including a tuned filter. The tuned filters have closely adjacent resonance frequencies, the same resonance curves, and the same resonance rises. The signals at the outputs of these three signal paths are so evaluated by means of four comparators and an RS flip-flop that the message tone signal appears at the Q output of the flip-flop only in the presence of the message tone frequency.

2 Claims, 3 Drawing Figures

CIRCUIT FOR DECODING TRAFFIC INFORMATION MESSAGE TONE SIGNALS

BACKGROUND OF THE INVENTION

The invention pertains to circuit for decoding traffic information message tone signals whose frequency, the message tone frequency, is the information marking a traffic information message. The tone signals are broadcast as amplitude-modulated signals which are received and demodulated with a conventional radio receiver.

In the journal "Funkschau", 1974, pages 535 to 538, a system for broadcasting traffic information to radio listeners is described which was introduced in Germany at that time and which is now used in other countries, also. In this system, a message tone signal is transmitted during a traffic information broadcast. In addition, regional tone signals are transmitted. These identifying signals are low-frequency signals which are impressed on the carrier, having a frequency of 57 KHz in the known system, by amplitude modulation. They are derived from the carrier by integral frequency division.

As stated in the journal "*Rundfunktechnische Mitteilungen*" 1974, pp. 193 to 202, where this traffic information broadcasting system is described in detail, the system parameters were so chosen that the decoder circuits required for automatic traffic information reception were compatible with conventional analog-signal-processing receiver circuits and, particularly, did not interfere with one another. The hitherto used decoder circuits are, therefore, analog circuits as well.

SUMMARY OF THE INVENTION

One object of the invention is to provide an integrated circuit for decoding traffic information message tone signals which works on digital principles and, thus, consists largely of digital subcircuits. The response time of the circuit is to be shorter than one second, e.g., 800 ms, and the message tone recognition is to be immune to noise.

Applicant's prior European Application 83 10 2412.4 corresponding to U.S. application Ser. No. 587,559, filed Mar. 8, 1984 now U.S. Pat. No. 4,561,115 describes an integrated circuit for decoding traffic information regional tone signals. The object to be attained there is comparable to that of the present invention but is modified for the purpose of that application. In attaining its object, the present invention resorts to a few subcircuits of the prior arrangement, while the overall arrangement in accordance with the present invention is obviously different from that of the prior application, which follows from the different purpose of the circuit in accordance with the present invention.

BRIEF DESCRIPTION OF THE DRAWING

The invention will be better understood from a reading of the following detailed description in conjunction with the drawing in which.

DETAILED DESCRIPTION

Figure 1:
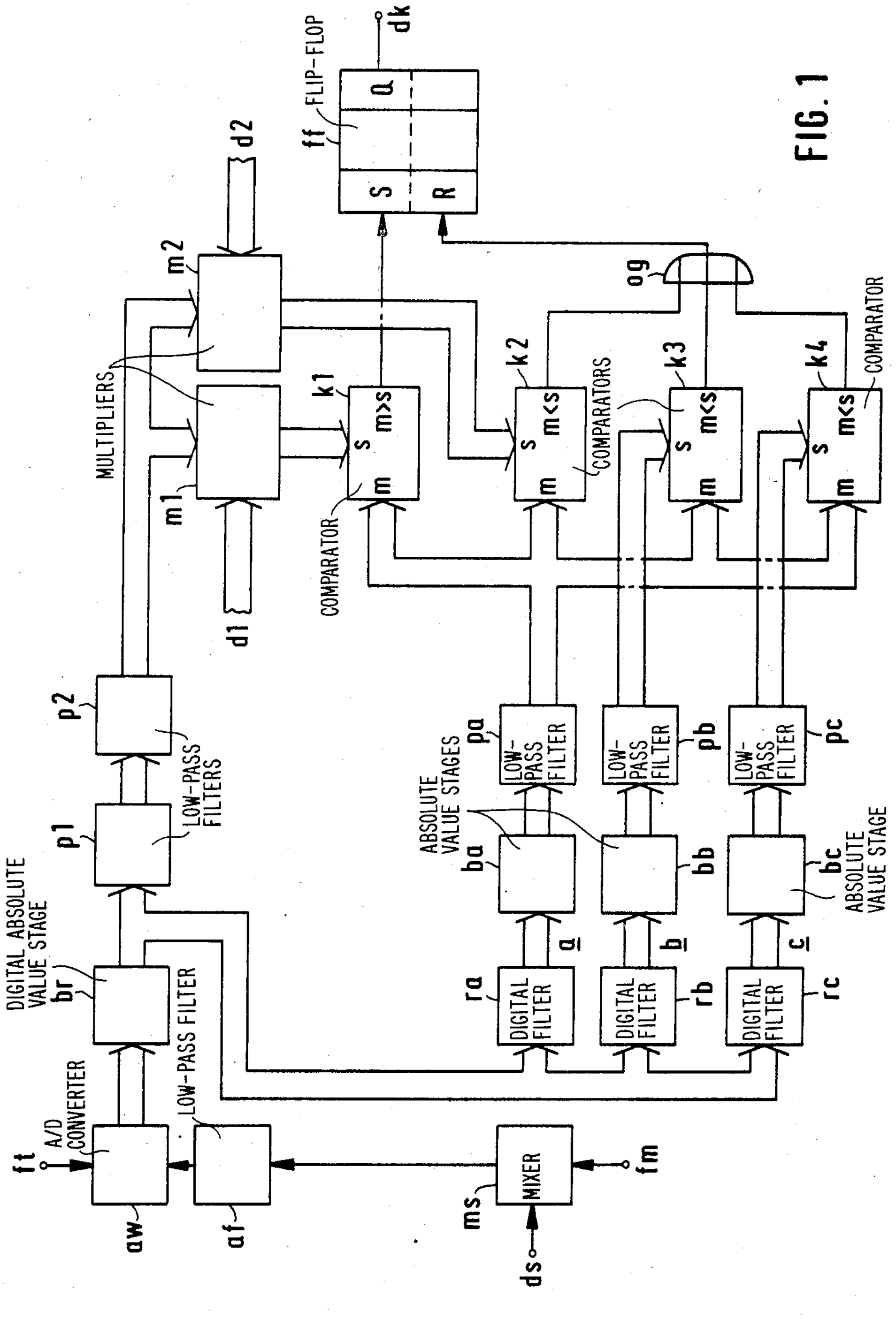
FIG. 1 is a block diagram of a circuit in accordance with the invention.

The block diagram of FIG. 1 shows one embodiment of an integrated circuit for decoding traffic information message tone signals in accordance with the invention. The demodulated broadcast signal ds, obtained by means of a conventional radio receiver, is fed to the mixer ms, to which a local-oscillator frequency fm is applied which is higher than the sum of the message tone frequency fa and the carrier frequency of the message tone signal. In the system described in the two journals cited above, the local-oscillator frequency must thus be higher than 57.125 kHz. The mixer ms converts the message tone signal modulated on the carrier to a low frequency.

The output of the mixer ms is coupled through the analog low-pass filter af to one input of the analog-to-digital converter aw, whose other input is presented with the clock signal ft. The upper cutoff frequency of the low-pass filter af is equal to half the frequency of the sampling signal of the analog-to-digital converter aw at the most. The output of the low-pass filter af is connected to the input of the digital absolute-value stage br. The latter forms the absolute value of the input signal, i.e., its output signal is always positive and equal to the pure numerical value of both a positive and a negative input signal; both the number $-7$ and the number $+7$ thus become $+7$.

Figure 2:
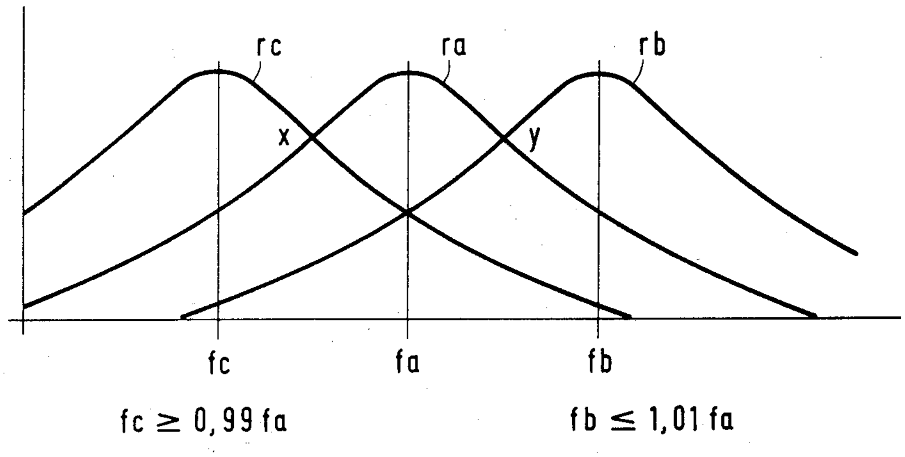
FIG. 2 shows schematically the resonance curves of the tuned filters used in the invention.

The output of the absolute-value stage br delivers the digital signal x in the baseband, and this signal is applied to the first signal path a for the message frequency fa, and to the second and third signal paths b and c for the frequencies fb and fc differing from the message tone frequency fa by a maximum of $+1\%$ and $-1\%$, respectively. Each of the signal paths consists of a tandem arrangement of the digital filter ra, rb, rc tuned to the respective frequency fa, fb, fc, the digital absolute-value stage ba, bb, bc, and the digital low-pass filter pa, pb, pc. The upper cutoff frequencies of these digital low-pass filters are lower than twice the message tone frequency fa, and the three tuned filters ra, rb, rc have the same bandwidth and the same resonant rise, as is illustrated in FIG. 2.

The output of the absolute-value stage br is also connected to the series combination of the first and second additional low-pass filters p1, p2. The upper cutoff frequency of the digital low-pass filter p1 is equal to the cutoff frequencies of the digital low-pass filters pa, pb, pc, and that of the digital low-pass filter p2 is equal to the frequency corresponding to the transient-time constants of the tuned filters ra, rb, rc. The digital low-pass filters p1 and p2 are followed by the constant multipliers m1 and m2 in two parallel branches.

The first signal path a leads to the minuend inputs m of the first, second, third, and fourth comparators k1, k2, k3, and k4, whose subtrahend inputs s are connected to the outputs of the first constant multiplier m1, the second constant multiplier m2, the second signal path b, and the third signal path c, respectively. The minuend-greater-than-subtrahend output m>s of the first comparator k1 is coupled to the S input of the RS flip-flop ff, whose Q output provides the binary message tone signal dk, and the minuend-smaller-than-subtrahend outputs m<s of the second, third, and fourth comparators k2, k3, and k4 are coupled through the OR gate og to the R input of the RS flip-flop off.

The constants d1, d2 of the constant multipliers m1, m2 are smaller than one. The constant d1 of the first constant multiplier m1 is equal to the nominal modulation factor of the message tone signal, and the constant d2 of the second constant multiplier is equal to a presettable fraction of the nominal modulation factor.

Figure 3:
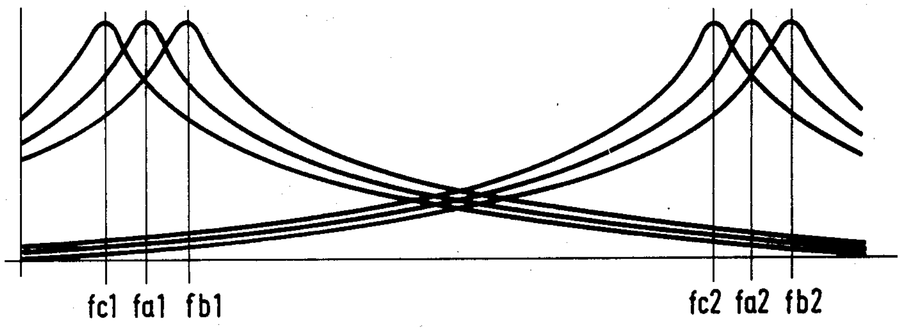
FIG. 3 shows schematically the positions of the resonance curves of FIG. 3 if two message tone signals have to be processed.

FIG. 3 shows that the arrangement in accordance with the invention can also be used if two or more message tone frequencies are transmitted, as is the case with a current U.S. standard, for example. Then, the three signal paths a, b, c, must be duplicated and designed for the respective frequencies, while the comparators associated with them, k1 . . . k4, and the RS flip-flop ff must only be duplicated.

The common subcircuit, too, must then be designed with regard to the maximum possible message tone frequency. For such an arrangement, FIG. 3 shows the shapes of the resonance curves of the six tuned filters, whose resonance frequencies are designated fa1, fb1, fc1; fa2, fb2, fc2.

By means of the absolute-value stage br, which performs full-wave rectification in a manner comparable to the action of a bridge rectifier on analog signals, the carrier amplitude modulated with the message tone signal is measured. At the same time, the message tone frequency is demodulated. The three signal paths a, b, c serve as selective level-measuring devices, with the signal path a measuring the message tone frequency, and the two signal paths b and c detecting closely adjacent interfering signals. Only if the signal applied to the three signal paths has a frequency between the intersection x, y of the resonance curve of the tuned filter ra and the resonance curves of the two other tuned filters will the signal appearing at the output of the signal path a be larger than the signals appearing at the two other signal paths b, c. A comparison by means of the comparators k3, k4 then determines whether the frequency of the input signal lies within the range between x and y.

The RS flip-flop ff is set by the comparator k1 if the signal appearing at the output of the signal path a is larger than the output signal of the absolute-value stage br which passed through the low-pass filters p1 and p2 and was multiplied by the factor d1. It is reset by means of the comparators k2 . . . k4 and the OR gate og whenever one of the output signals of the signal paths b, c is larger than that of the signal path a or becomes smaller than the output signal of the absolute-value stage br which passed through the low-pass filters p1, p2 and was multiplied by the factor d2. With the factor d2, a circuit hysteresis can thus be set.

The invention can be implemented to advantage in the form of semiconductor integrated circuits. As it works exclusively on digital principles, at least as far as the subcircuits behind the analog-to-digital converter aw are concerned, the semiconductor-circuit families commonly used for digital signal processing circuits can be employed, particularly MOS integrated circuits, i.e., insulated-gate field-effect transistor integrated circuits. Another advantage is that, since the resonance frequencies of the tuned filters lie within the one-percent range, very good interference suppression and reliable message tone frequency recognition are achieved. With analog tuned filters, such closely adjacent resonance frequencies would only be realizable with a considerable amount of circuitry.

What is claimed is:

1. A circuit for decoding traffic information message tone signals each having a message tone frequency, marking a traffic information message, said tone signals being contained, in the form of a carrier amplitude-modulated therewith, in a received broadcast signal demodulated with a conventional radio receiver, said circuit comprising:

means responsive to the demodulated broadcast signal for deriving, by further demodulation and analog-to-digital conversion, a digital signal in the baseband;

a first signal path to which said digital signal is applied for each message tone frequency;

second and third signal paths to which said digital signal is applied for frequencies differing from said message tone frequency by a maximum of +1% and −1%, respectively;

each of said first, second and third signal paths including a tandem arrangement of a digital filter tuned to the respective frequency, the digital filters for all of said first, second and third paths having the same bandwidth and the same resonant rise, a digital absolute-value stage, and a digital low-pass filter having an upper cutoff frequency lower than twice the message tone frequency;

a series combination of a first additional digital low-pass filter and a second additional low-pass filter receiving said digital signal, said first additional low-pass filter having an upper cutoff frequency equal to that of the digital low-pass filters, and said second additional digital low-pass filter, having an upper cutoff frequency equal to the frequency corresponding to the transient-time constant of the tuned filters;

first, second, third and fourth digital comparators, each having a minuend input and a subtrahend output, said first digital comparator having a minuend-greater-than-subtrahend output, said second, third and fourth digital comparators each having a minuend-smaller-than-subtrahend output, said first signal path being coupled to the minuend inputs of said first, second, third, and fourth digital comparators, the subtrahend inputs of said third and fourth comparators being connected to the outputs of said second signal path and said third signal path, respectively;

a first constant multiplier coupling the output of said second additional low-pass filter to said first comparator subtrahend input;

a second constant multiplier coupling the output of said second additional low-pass filter to said second comparator subtrahend input;

an RS flip-flop having its S input coupled to the minuend-greater-than-subtrahend output of said first comparator and providing the message tone signal at its Q output;

an OR gate coupling the minuend-smaller-than-subtrahend outputs of said second, third, and fourth comparators to the R input of said RS flip-flop; and wherein said first constant multiplier has a constant smaller than one, said constant being equal to the nominal modulation factor of the message tone signal; said second constant multiplier having a constant smaller than one, said constant being equal to a presettable fraction of the nominal modulation factor.

2. A circuit in accordance with claim 1, wherein:

said means for deriving comprising a mixer for mixing said demodulated broadcast signal with a local-oscillator frequency higher than the sum of the message tone frequency and the carrier frequency of the message tone signal, an analog-to-digital converter having a sampling signal input, an analog low-pass filter having a maximum upper cutoff frequency equal to half the frequency of the sampling signal of said analog-to-digital converter for coupling the output of the mixer to said analog-to-digital converter and an additional digital absolute-value stage coupled to receive the output of said analog low-pass filter.

* * * * *